Patented Dec. 17, 1946

2,412,882

UNITED STATES PATENT OFFICE 2,412,882

TRIMETHYLENE CHLORBROMIDE

Clyde B. Gardenier, Belleville, N. J., assignor to Thomas A. Edison, Incorporated, West Orange, N. J., a corporation of New Jersey No Drawing. Application June 3, 1944, Serial No. 538,701

4 Claims. (Cl. 260—658)

This invention relates to novel methods for the production of trimethylene chlorbromide. The present application is a continuation in part of my copending application 431,815 filed February 21, 1942.

In said copending application I have disclosed a method for producing trimethylene chlorbromide by saturating with substantially pure oxygen a solution of allyl chloride and water and adding to said solution hydrogen bromide and substantially pure oxygen. While this method was generally satisfactory, I found that occasionally the reaction would not proceed as desired, which necessitated shut-downs and making certain adjustments. It was in order to correct these difficulties that the present invention was made thus to provide a simple, efficient and easily controlled method for reacting hydrogen bromide with allyl chloride to produce high yields of trimethylene chlorbromide at an even tenure of daily production. Furthermore my novel process is more orderly and regular in operation and requires much less operational attention.

According to this invention the allyl chloride employed may be pure allyl chloride or more generally is the commercial allyl chloride which may be newly distilled, aged allyl chloride or that generally obtained in steel drums on the market. The allyl chloride of commerce which customarily is packed in steel drums may contain as impurities therein such reducing compounds as ferrous chloride, sulphur, sulphur dioxide, chromous, manganous or cuprous salts or other inorganic reducing agents. And, it is to the presence of these impurities that I attribute the reaction fouling or inhibiting action which was occasionally experienced in carrying out my old process. In the practice of this invention there are simultaneously added hydrogen bromide and free bromine to a substantially saturated solution of water in allyl chloride which solution has been completely saturated with substantially pure oxygen. Thus this procedure may be the same as that set forth in my copending application with the exception that free bromine is added to the allyl chloride at the same time the hydrogen bromide is added thereto. However, in the preferred form of this invention, the allyl chloride has simultaneously added thereto the substantially pure oxygen, the water, hydrogen bromide and free bromine. A very simple and expeditious manner of carrying out this general method is to place the allyl chloride in a glass vessel in which the reaction is to take place. This allyl chloride may be first saturated with substantially pure oxygen before there is any other addition thereto and no water in bulk need be added thereto. This oxygen addition before other additions may be dispensed with if desired and while bulk water may be added to the allyl chloride before the other addition, I prefer to eliminate this addition at this stage.

In one of the embodiments of this invention, I may employ a single or a plurality of scrubbers arranged in series. Each scrubber contains a saturated solution of hydrogen bromide in water and this solution contains between 1% to 4% free bromine and preferably about 2% free bromine. Both hydrogen bromide gas and substantially pure oxygen, which as commercially available contains approximately 95% oxygen, are passed through said scrubber and if more than one is used, first through one and then through the other. In passing through said free bromine containing saturated hydrogen bromide in water solution, the oxygen and hydrogen bromide gases which become intermingled, pick up water and free bromine and as these gases leave the last scrubber, they carry therewith, free bromine and water vapors. These scrubbers may be at room temperature. If desired, this mixture of gases and vapors may be passed through a cooling chamber in order to reduce the quantity of vapors carried thereby although this cooling chamber may be omitted if desired. From the cooling chamber, the mixture of gases and vapors enters the reaction chamber containing the allyl chloride. This mixture is bubbled into the allyl chloride to provide hydrogen bromide and oxygen gases saturated with water and free bromine vapors. The hydrogen bromide in said mixture appears to have become activated by the free bromine therein, reacts practically immediately with the allyl chloride in the presence of the water and substantially pure oxygen to produce trimethylene chlorbromide in yields of approximately 100%. The reaction is exothermic and proceeds with considerable vigor. Therefore the reaction chamber is cooled to maintain the temperature thereof below 43° C. and at about 40° C. The bubbling of said mixture into the allyl chloride is continued until the density of the liquid in the reaction chamber reaches about 1.58 indicating completion. The liquid is drawn from this chamber, is washed with a saturated aqueous solution of sodium carbonate and subsequently distilled under vacuum. The fraction having a boiling point of about 146° C. and a density of 1.588 is pure water-white trimethylene chlorbromide.

While the present invention has been described in detail, it is not to be limited thereby as they may be varied without departing from the scope of the invention.

Having thus described my invention, what I claim and desire to protect by Letters Patent is:

1. The method for producing trimethylene chlorbromide comprising to a substantially pure oxygen saturated solution of allyl chloride and water adding hydrogen bromide and free bromine.

2. The method for producing trimethylene chlorbromide comprising adding simultaneously water, substantially pure oxygen, hydrogen bromide to allyl chloride and free bromine.

3. The method for producing trimethylene chlorbromide comprising adding to allyl chloride a gaseous mixture of substantially pure oxygen and hydrogen bromide containing water and free bromine vapors.

4. The method for producing trimethylene chlorbromide comprising simultaneously passing hydrogen bromide and substantially pure oxygen through a free bromine containing aqueous solution of hydrogen bromide and then passing the oxygen and hydrogen bromide gases and water and free bromine vapors produced into allyl chloride.

CLYDE B. GARDENIER.